United States Patent [19]
Takeuchi et al.

[11] Patent Number: 5,402,926
[45] Date of Patent: Apr. 4, 1995

[54] BRAZING METHOD USING PATTERNED METALLIC FILM HAVING HIGH WETTABILITY WITH RESPECT TO LOW-WETTABILITY BRAZING METAL BETWEEN COMPONENTS TO BE BONDED TOGETHER

[75] Inventors: Yukihisa Takeuchi, Aichi; Natsumi Shimogawa, Nagoya; Nobuo Takahashi, Owariasahi, all of Japan

[73] Assignee: NGK Insulators, Ltd., Japan

[21] Appl. No.: 127,494

[22] Filed: Sep. 28, 1993

[30] Foreign Application Priority Data

Oct. 1, 1992 [JP] Japan ................................ 4-286855

[51] Int. Cl.⁶ .............................................. B23K 1/20
[52] U.S. Cl. ..................................... 228/174; 228/215; 228/209; 228/254; 228/190
[58] Field of Search ............... 228/174, 215, 253, 254, 228/262.42, 262.43, 208, 209, 190

[56] References Cited

U.S. PATENT DOCUMENTS

| | | | |
|---|---|---|---|
| 3,110,102 | 11/1963 | Pfeffkorn | 228/215 X |
| 3,330,027 | 7/1967 | Kernander et al. | 228/252 X |
| 4,530,464 | 7/1985 | Yamamoto et al. | 228/215 X |
| 4,603,805 | 8/1986 | Rogers | 228/209 X |
| 4,875,619 | 10/1989 | Anderson et al. | 228/209 |
| 4,960,236 | 10/1990 | Hedges et al. | 228/248.1 |
| 4,972,989 | 11/1990 | Black et al. | 228/179 |

FOREIGN PATENT DOCUMENTS

| | | |
|---|---|---|
| 51-107251 | 9/1976 | Japan . |
| 52-51569 | 4/1977 | Japan . |
| 53-52264 | 5/1978 | Japan . |
| 54-80254 | 6/1979 | Japan . |
| 58-975 | 4/1982 | Japan ........................ 228/262.42 |
| 59-219483 | 12/1984 | Japan . |

OTHER PUBLICATIONS

Patent Abstracts of Japan, vol. 014, No. 161 (E-909), Mar. 28, 1990 & JP-A-02 017 603 (Matsushita Electric Inc Co) Jan. 22, 1990.
Database WPI, Week 7914, Derwent Publications Ltd., London, GB; AN 7926885B 14 & JP-A-54 026 459 (Matsushita Elec Ind K.K.) Feb. 28, 1979.

*Primary Examiner*—Kenneth J. Ramsey
*Attorney, Agent, or Firm*—Parkhurst, Wendel & Rossi

[57] ABSTRACT

A method of brazing a plurality of components by heating the components superposed on each other with a brazing material interposed between adjacent bonding surfaces of the components, wherein the brazing material has a relatively low degree of wettability with respect to the material of the components to be brazed, and is applied to a patterned film of a high-wettability metal having a relatively high degree of wettability with respect to the brazing material, which film is formed on at least one of bonding surfaces of the components, so as to cover predetermined areas of the bonding surface while leaving adjacent non-bonding areas of the bonding surface uncovered so as to restrict the flow of brazing material.

23 Claims, 5 Drawing Sheets

BRAZING METHOD USING PATTERNED METALLIC FILM HAVING HIGH WETTABILITY WITH RESPECT TO LOW-WETTABILITY BRAZING METAL BETWEEN COMPONENTS TO BE BONDED TOGETHER

BACKGROUND OF THE INVENTION

1. Field of the Invention

The present invention relates to a method of brazing relatively small components of precision devices, instruments and equipment such as ink-jet printers and various audio devices.

2. Discussion of the Related Art

In the field of office automation devices and audio-video devices, efforts to reduce the size and weight of the devices have been made at an accelerated pace, and there have been increasing needs of reducing the size and improving the precision (e.g., dimensional accuracy), of the components incorporated in such devices. For instance, an ink-jet printer widely used as an output device of a computer is equipped with an ink-jet print head of a structure having nozzles in the form of minute holes of 30–50 $\mu$m diameters, and ink passageways and chambers whose cross sectional dimensions range from several tens to several hundreds of microns, for example.

For forming such small-sized nozzles, passageways and chambers of the ink-jet print head with high dimensional accuracy, a plurality of thin metallic planar members or plates are formed with various holes, windows, apertures and any other openings by suitable techniques such as etching, pressing and punching utilizing photolithography. These metallic plates are bonded together into an integral structure which has internally defined ink passageways and chambers corresponding to the openings, and externally open nozzles corresponding to the holes.

In the conventional manufacture of an ink-jet print head constructed as described above, the metallic plates are bonded together, usually by an organic or inorganic adhesive or bonding agent, which is suitable for assuring high sealing or tightness to an ink. This bonding using an adhesive suffers from easy flow, spreading or dislocation of the adhesive beyond the intended bonded portions of the plates toward the ink passageways, etc., whereby the passageways and other open spaces within the head structure tend to have deviations from the nominal shapes, leading to deterioration of the quality of the ink-jet print head. When an organic adhesive is used, in particular, the holes and other openings formed through the metallic plates are likely to be plugged or partially filled with the adhesive. In this case, the produced print head does not normally function, and the yield ratio of the products is considerably lowered. On the other hand, an attempt to reduce the amount of the adhesive for avoiding the above problem leads to another problem, namely, increased possibility of bonding failure at local portions of the metallic plates, which results in lowering the fluid tightness or sealing with respect to the ink.

To solve the above problems, there have been proposed the following methods, which include by way of example:

(1) Using a magnetic material for metallic plates, so that the plates are secured to each other by a magnetic force;

(2) Interposing a mass of a magnetic fluid between bonding surfaces of metallic plates, for improving the sealing with respect to the ink;

(3) Injection-molding a plastic plate with necessary ink passageways and chambers, within a mold in which metallic plates are positioned in place, so that the metallic plates are bonded to the plastic plate, concurrently with the formation of the plastic plate, to thereby form an integral structure; and (4) using plastic materials for all plates constituting an integral structure, with an organic solvent applied to the bonding surfaces of the plastic plates, so that the plastic plates are bonded together under pressure, with the plastic materials near the bonding surfaces dissolved by the organic solvent.

However, the above methods all suffer from another problem such as increased costs of the material or the production facility, or deterioration of the dimensional accuracy and strength due to the use of plastic materials. Thus, the proposed solutions are not practically satisfactory, for economically producing a high-quality ink-jet print head.

There have been some attempts to bond metallic plates by an ordinary brazing process, which usually employs a brazing material which has a comparatively high degree of wettability with respect to the metallic plates, to assure satisfactory bonding of the plates. In this case, the brazing material tends to spread easily beyond the intended bonding areas, leading to detrimental plugging or closing of the nozzles. On the other hand, the use of a brazing material having a relatively low degree of wettability to the metallic plates results in difficult application of the brazing material so as to assure uniform thickness over the entire area of bonding of the plates. In this case, the produced print head may suffer from poor or incomplete sealing of pumping chambers, for example, due to local bonding failure or defects, which leads to leakage of the pressurized ink. Alternatively, the print head may have an air gap between the bonding surfaces, which causes air trapping in the air gap and a pressure loss in the pumping chambers, causing undesired ink jetting characteristics of the print head.

Recently, a brazing technique, so-called "vacuum brazing" at a sub-atmospheric pressure finds various applications in the field of bonding of small precision components. It is generally recognized that this vacuum brazing technique permits the manufacture of an ink-jet print head as described above, with high accuracy without problems such as plugging of the nozzles, even when the metallic plates are bonded together by a brazing material which has a comparatively high degree of wettability with respect to the metallic plates.

However, the vacuum brazing process requires a large-sized, expensive vacuum heating furnace to melt the brazing material, inevitably resulting in an extremely high cost of manufacture of the print head, as compared with the cost where an ordinary brazing process is utilized.

SUMMARY OF THE INVENTION

It is therefore an object of the present invention to provide a method of brazing metallic components, which uses a brazing material having a relatively low degree of wettability with respect to the metallic components, to avoid dislocation or spreading of the brazing material beyond the desired bonding areas of the plates, and which assures comparatively easy and economical bonding of the plates, while preventing bonding defects and minimizing or eliminating drawbacks that may result from such bonding defects.

The above object may be achieved according to the principle of the present invention, which provides a method of brazing a plurality of components by heating the components superposed on each other with a brazing material interposed between adjacent bonding surfaces of the components, the method comprising the steps of: using a brazing material which has a relatively low degree of wettability with respect to the material of the components to be brazed; forming a patterned film of a high-wettability with respect to the brazing material, on at least one of bonding surfaces of the components, so as to cover bonding areas of each of the above-indicated at least one bonding surface; and applying the brazing material to the patterned film of the high-wettability metal.

The components to be brazed may be made of stainless steel. In this case, a silver-brazing alloy or silver-based alloy may be preferably used as the brazing material, and nickel (Ni) may be suitably used as the high-wettability metal to which the silver-brazing alloy is applied.

When the components to be brazed are both made of stainless steel, the patterned film of the high-wettability metal is preferably formed on each of the bonding surfaces of the components. However, when the components to be brazed are made of different materials, for example, stainless steel and nickel, the patterned film of the high-wettability metal such as nickel may be formed on only the bonding surface of the stainless steel component.

In the brazing method of the present invention described above, a patterned film of a suitable high-wettability metal having a comparatively high degree of wettability with respect to the brazing material is first formed on at least one of the adjacent bonding surfaces of the components to be brazed, so that the desired bonding areas are covered by the patterned film of the high-wettability metal. Then, the brazing material which has a comparatively low degree of wettability with respect to the material of the components is applied to the patterned film of the high-wettability metal. When the brazing material is heated to a molten state, the molten brazing material spreads over the patterned film of the high-wettability metal, which covers the desired bonding areas of the bonding surface or surfaces of the components. Since the brazing material has a comparatively low degree of wettability with respect to the material of the components, the brazing material will not spread over the exposed non-bonding areas of the bonding surface or surfaces.

Therefore, the present brazing method permits the application of the brazing material to only the desired bonding areas of the bonding surface or surfaces of the components, without spreading or dislocation of the brazing material beyond the desired bonding areas, even when the quantity of the brazing material is large enough to assure firm braze welding of the components. The use of the brazing material in a sufficient large amount effectively prevents the conventionally encountered bonding defects such as air gaps between the bonding surfaces of the components, while the patterned film of the high-wettability metal prevents or minimizes the spreading or dislocation of the brazing material over the non-bonding areas of the components.

Further, the present brazing method does not require special process steps and equipment and can be practiced in a manner similar to an ordinary brazing procedure, except for the application of the patterned film of the high-wettability metal to the components to be bonded together, which can be accomplished in a relatively simple process. Thus, the present brazing method permits comparatively easy and economical brazing of small-sized components, without using any costly facility such as a vacuum heat-treating furnace as used for vacuum brazing at sub-atmospheric pressure.

BRIEF DESCRIPTION OF THE DRAWINGS

The above and optional objects, features and advantages of the present invention will be better understood by reading the following detailed description of a presently preferred embodiment of the invention, when considered in connection with the accompanying drawings, in which.

DETAILED DESCRIPTION OF THE PREFERRED EMBODIMENT

Figure 1:
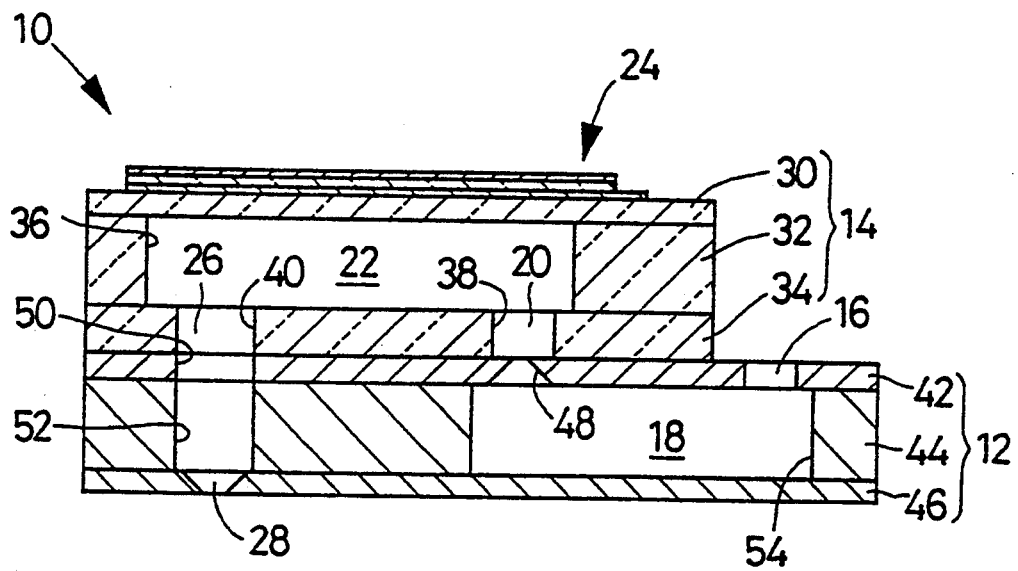
FIG. 1 is a schematic elevational view in cross section of an ink-jet print head which has a nozzle member whose component plates are bonded together by a brazing method of the present invention.

Referring first to the schematic view of FIG. 1, there is generally indicated at 10 an ink-jet print head produced according to one embodiment of this invention. The ink-jet print head 10 is an integral structure consisting of a nozzle member 12 and a pump member 14 which are integrally bonded together. The nozzle member 12 has an ink inlet 16, and a distributor chamber 18 which accommodates a certain volume of an ink introduced through the ink inlet 16. The ink is supplied from a suitable ink reservoir not shown. The print head 10 has a plurality of first communication passageways 20, and a plurality of corresponding pumping chambers 22 formed in the pump member 14. The pumping chambers 22 communicate with the distributor chamber 18 through the respective first communication passageways 20, so that the ink is delivered from the distributor chamber 18 to the individual pumping chambers 22 through the respective passageways 20. The pump member 14 is provided with a plurality of piezoelectric/electrostrictive elements 24 (hereinafter referred to as "piezoelectric elements 24") corresponding to the pumping chambers 22. The piezoelectric elements 24 are formed on one of opposite major surfaces of the pump member 14 remote from the nozzle member 12. The print head 10 has a plurality of second communication passageways 26 communicating with the respective pumping chambers 22, and a plurality of nozzles 28 formed in the nozzle member 12. The nozzles 28 communicate with the respective second communication passageways 26, so that the ink in the pumping chambers 22 is delivered from the nozzles 28 through the respective second communication passageways 26, when the pumping chambers 22 are activated by the respective piezoelectric elements 24, as well known in the art.

Figure 2:
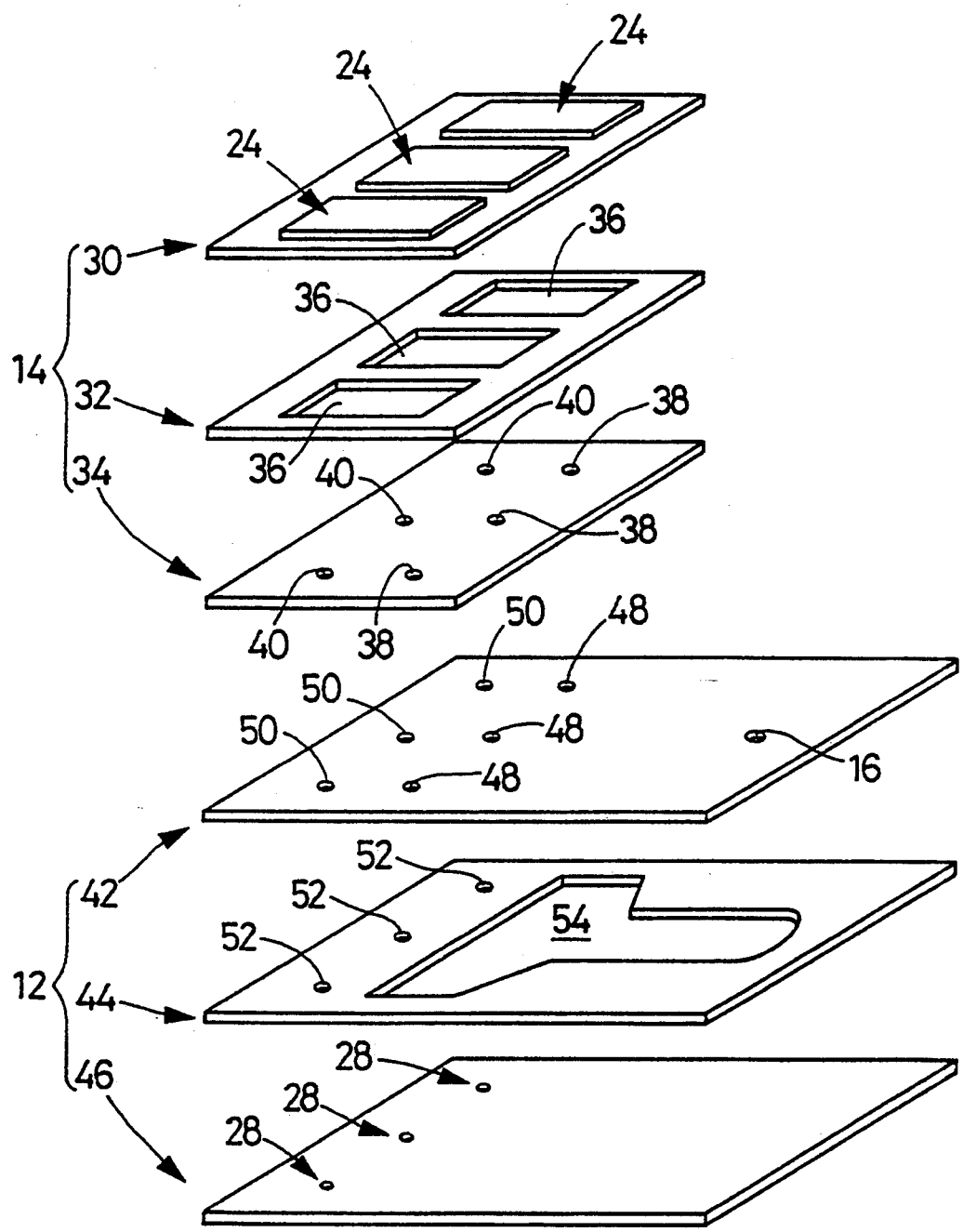
FIG. 2 is an exploded explanatory view in perspective illustrating the structure of the ink-jet print head of FIG. 1.

To produce the ink-jet print head 10 constructed as described above, the nozzle member 12 and the pump member 14 are separately prepared and bonded together by a suitable bonding agent, as described below. The pump member 14 consists of a closure plate 30, a spacer plate 32 and a connector plate 34, and is prepared in the manner described below in detail by reference to FIG. 2. In the illustrated embodiment, the print head 10 has three pumping chambers 22 and three nozzles 28, by way of example.

The closure, spacer and connector plates 30, 32, 34 are formed from respective green sheets having relatively small thickness values. On the first green sheet for the closure plate 30, three are formed three green laminar layers for the piezoelectric elements 24, by a suitable film forming technique known in the art. The second green sheet for the spacer plate 32 has three rectangular windows 36 formed through its entire thickness, by a suitable known method, such that the windows 36 are spaced apart from each other in the direction of length of the green sheet. The third green sheet for the connector plate 34 has a row of three first holes 38 and a row of three second holes 40. These holes 38, 40 are formed through the entire thickness of the green sheet, by a suitable known method. The first and second holes 38, 40 constitute upper portions of the first and second communication passageways 20, 26, respectively.

The thus formed first, second and third green sheets for the plates 30, 32, 34 are superposed on each other to provide a green laminar structure, such that the second green sheet for the spacer plate 32 is sandwiched between the first and third green sheets for the closure and connector plates 30, 34, and such that the three green laminar layers on the first green sheet for the piezoelectric elements 24 are aligned with the corresponding three windows 36 in the second green sheet, and with the corresponding three sets of first and second holes 38, 40 in the third green sheet. The thus prepared green laminar structure is fired to provide the integral pump member 14 with the piezoelectric elements 24 formed on its upper surface. In this pump member 14, the three pumping chambers 22 are defined such that the corresponding windows 36 are closed by the closure and spacer plates 30, 34. It is noted that the piezoelectric elements 24 may be formed after the pump member 14 is prepared by firing the green laminar structure consisting of the three green sheets indicated above.

The nozzle member 12 consists of an orifice plate 42, a distributor plate 44 and a nozzle plate 46, which are formed of stainless alloy or steel (SUS304 according to the Japanese Industrial Standard). These three stainless steel plates 42, 44, 46 are brazed together by using a brazing material so-called a silver-brazing alloy or silver solder, which is a silver-based solder or alloy composed of silver, copper and zinc, for example.

Described more specifically, the orifice plate 42 is prepared by forming a row of three first orifice holes 48, a row of three second orifice holes 50 and the ink inlet 16 through the thickness of a first thin stainless steel plate (SUS304), by a suitable known technique such as laser cutting, machining, or photolithography. The first and second orifice holes 48, 50 constitute lower portions of the first communication passageways 20 and intermediate portions of the second communication passageways 20, 26, respectively. The distributor plate 44 is prepared by forming a row of three holes 52 and a window 54 through the thickness of a second thin stainless steel plate (SUS304), by a suitable known technique as indicated above. The three holes 52 constitute lower portions of the second communication passageways 26. Similar, the nozzle plate 46 is prepared by forming the three nozzles 28 through the thickness of a third thin stainless steel plate (SUS304).

Figure 3A:
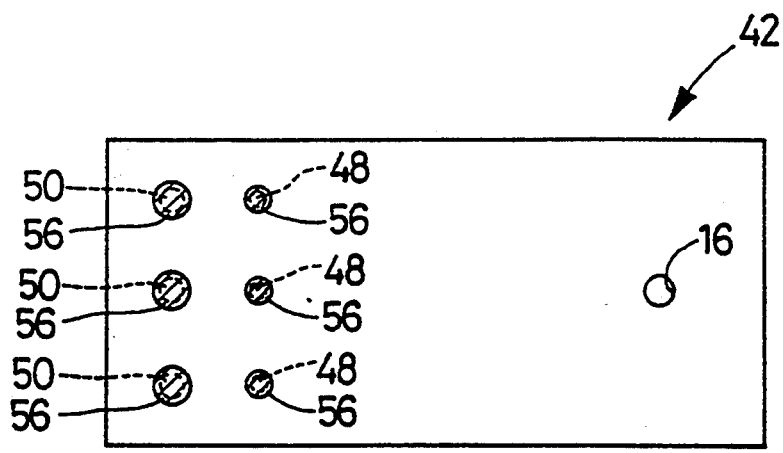
FIGS. 3A, 3B and 3C are explanatory plan views showing a process step performed on the component plates of the nozzle member of FIG. 1 according to the present invention.
Figure 3B:
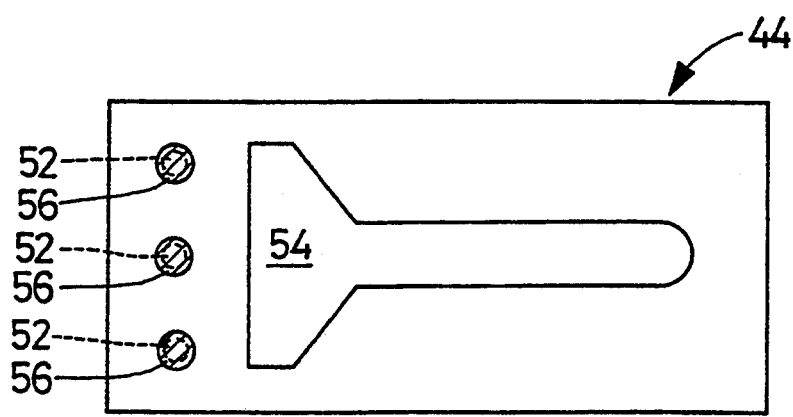
Figure 3C:
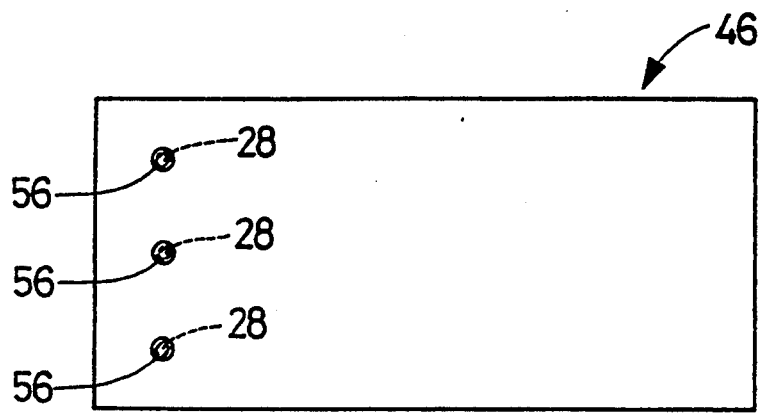

Successively, all surfaces of the thus processed stainless steel plates 42, 44, 46 are subjected to ultrasonic cleaning using ethyl alcohol. Then, resin films 56 consisting of a suitable resin material are applied to the plates 42, 44, 46, as protective films so as to close the upper and lower openings of the first and second orifice holes 48, 50, holes 52 and nozzles 28, by a suitable known patterning technique such as screen-printing technique, as shown in FIGS. 3A, 3B and 3C. The resin films 56 should cover annular areas around the edge of the openings of the holes 48, 50, 52 and nozzles 28, as indicated in FIGS. 3A, 3B and 3C. For example, the resin films 56 are formed by printing using a resin paste, by a technique as used for applying a masking resist, or by leaving appropriate portions of a resin film applied to cover the entire surfaces of the stainless steel plates. The films 56 used as the protective films may be any resin material such as a resist M-85 available from Taiyo Ink, Japan, unless it causes deformation or deterioration of the stainless steel plates 42, 44, 46. These plates with the resin films 56 are placed in an oven to cure the resin material under heat.

The three stainless steel plates 42, 44, 46 are then subjected to electroplating, to cover the surfaces of the plates with a suitable metallic material, except at the areas covered by the protective films in the form of the resin films 56. The metallic material should have a relatively high degree of wettability with respect to a brazing material, namely, silver-brazing alloy in this embodiment, which is used for brazing the stainless steel plates 42, 44, 46 as described below. In this specific embodiment, nickel (Ni) is used as high-wettability metal for the electroplating of the plates 42, 44, 46. The thickness of the nickel plating is preferably about 1 $\mu$m.

Figure 4A:
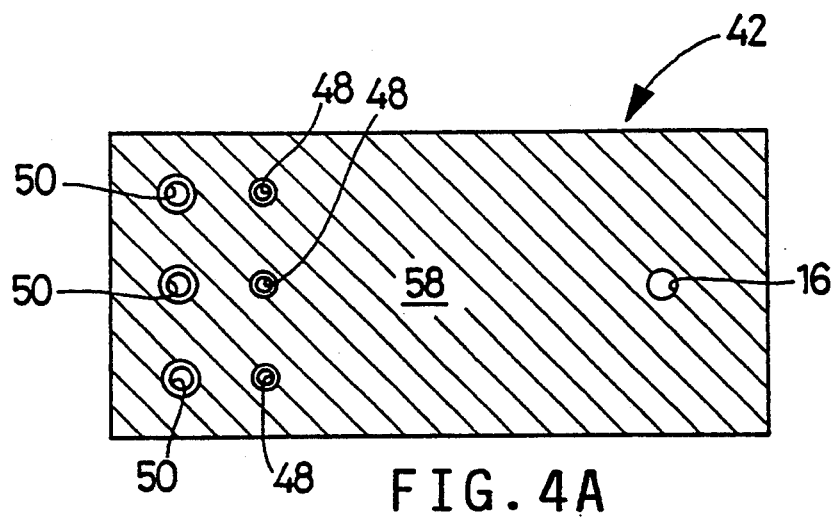
FIGS. 4A, 4B and 4C are explanatory plan views showing another process step performed on the component plates of the nozzle member according to the invention.
Figure 4B:
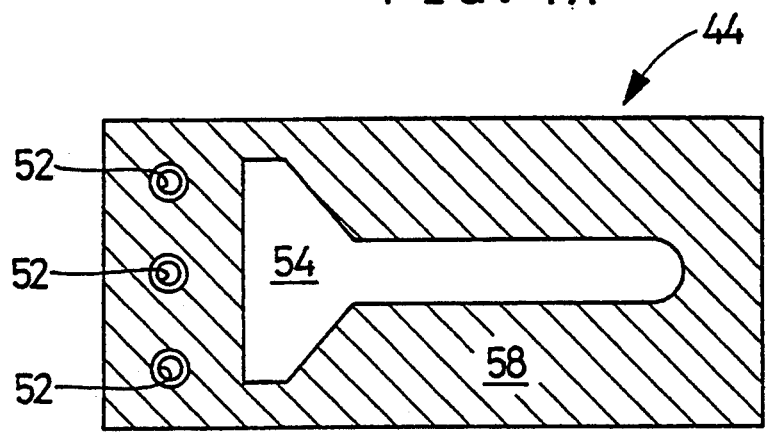
Figure 4C:
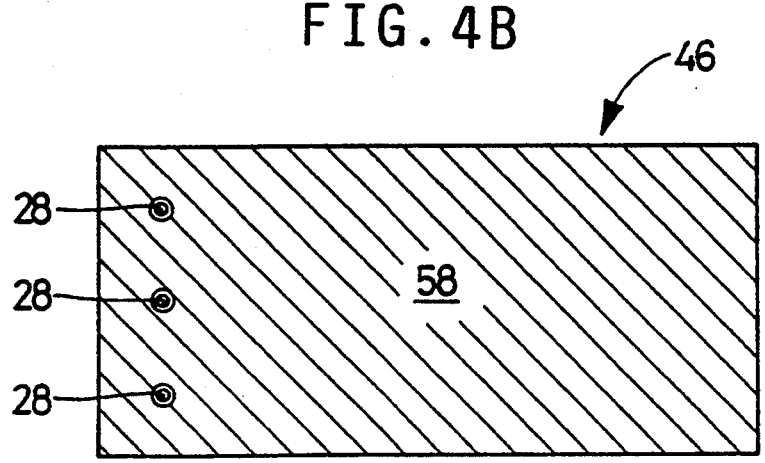

The stainless steel plates 42, 44, 46 thus plated with nickel (Ni) are immersed, for an appropriate time, in a suitable solution (e.g., methylene chloride) generally used to remove a resin material, so that the resin films 56 are removed from the stainless steel plates. As a result, each of the orifice plate 42, distributor plate 44 and nozzle plate 46 is covered with patterned Ni plating films 58, while exposing the inner surfaces of the first and second orifice holes 48, 50, holes 52 and nozzles 28, and the annular areas around the openings of these holes 48, 50, 52 and nozzles 28, as indicated in FIGS. 4A, 4B and 4C. The solution used to remove the resin films 56 may be any known solution capable of removing a resist as used for an etching mask, unless the solution causes deformation or deterioration of the stainless steel plates 42, 44, 46.

It is noted that while FIGS. 3A, 3B, 3C, 4A, 4B and 4C show only upper surfaces of the stainless steel plates (orifice plate, distributor plate and nozzle plate) 42, 44, 46, the resin films 56 and the patterned Ni plating films 58 are provided also on the lower surfaces of the plates 42, 44, 46.

Figure 5:
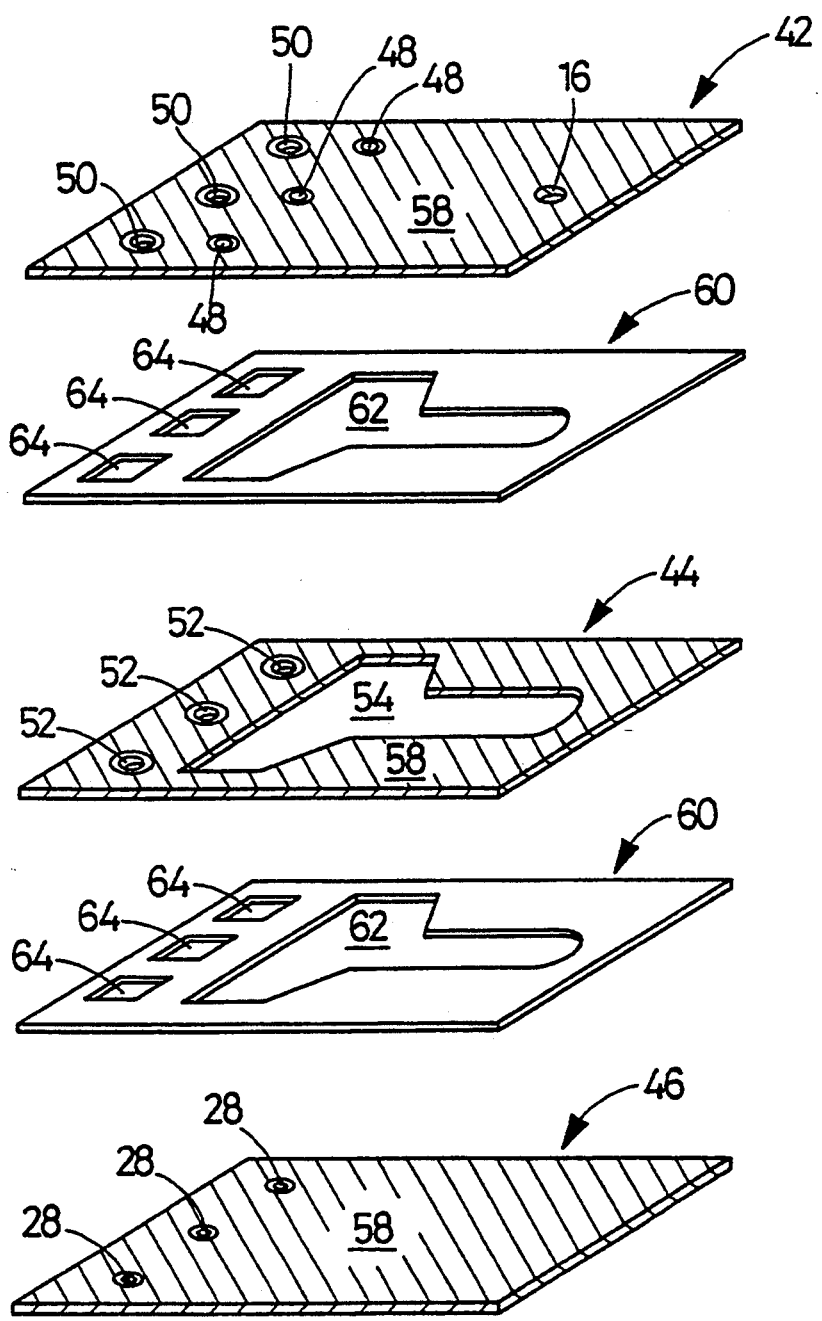
FIG. 5 is an exploded explanatory view in perspective illustrating a further process step performed on the component plates of the nozzle member according to the present invention.

The silver-brazing alloy used for brazing the orifice, distributor and nozzle plates 42, 44, 46 takes the form of two brazing sheets 60 each having a thickness of about 15 μm and substantially the same dimensions and configuration as the plates 42, 44, 46, as shown in FIG. 5. Each brazing sheet 60 has an aperture 62 formed in a central portion thereof, and an array of three generally rectangular apertures 64 formed on one side of the aperture 62. The aperture 62 has substantially the same configuration as the window 54 of the distributor plate 44, and the apertures 64 are arranged along one of opposite short sides of each brazing sheet 60.

The three stainless steel plates 42, 44, 46 and the two brazing sheets 60 are superposed on each other in the order as shown in FIG. 5, such that one of the brazing sheets 60 is interposed between the orifice plate 42 and the distributor plate 44, while the other brazing sheet 60 is interposed between the distributor plate 44 and the nozzle plate 46. The plates 42, 44, 46, 60 are positioned relative to each other so that the three second orifice holes 50, three holes 52, three nozzles 28 and three rectangular apertures 64 are aligned with each other, while the window 54 of the distributor plate 44 is aligned with the central apertures 62 of the brazing sheets 60, and so that the first orifice holes 48 and ink inlet 16 of the orifice plate 42 are open to the central aperture 62 of the adjacent brazing sheet 60.

Then, a weight made of molybdenum is placed on the thus obtained stack of the stainless steel plates 42, 44, 46 and brazing sheets 60. The assembly of this stack and the molybdenum weight is introduced into a furnace of a belt conveyor type, for heating and melting the two brazing sheets 60 interposed between the bonding surfaces of the three stainless steel plates 42, 44, 46. As a result, the stainless steel plates are brazed together to provide the integral nozzle member 12.

The pump member 14 is placed on the thus prepared nozzle member 12, with a layer of a suitable bonding agent such as an epoxy resin interposed therebetween, such that the connector plate 34 of the pump member 14 remote from the piezoelectric elements 24 is in contact with the orifice plate 42 of the nozzle member 12 through the layer of the bonding agent. The nozzle and pump members 12, 14 should be positioned relative to each other such that the first and second orifice holes 49, 50 of the nozzle member 12 are aligned with the first and second holes 39, 40 of the pump member 14, so that the first communication passageways 20 are constituted by the holes 38 and 48, while the second communication passageways 26 are constituted by the holes 40, 50, 52. Thus, the nozzle and pump members 12, 14 are bonded together into the integral ink-jet print head 10 as shown in FIG. 1. The bonding agent or adhesive used for bonding the nozzle and pump members 12, 14 may be any bonding material capable of suitably bonding stainless steel and ceramics.

The silver-brazing alloy used as the brazing sheets 60 has a relatively high degree of wettability with respect to Ni, that is, the Ni plating films 58, as indicated above, but has a relatively low degree of wettability with respect to stainless steel SUS304, that is, the plates 42, 44, 46 to be bonded together. Accordingly, the silver-brazing alloy in the molten state upon brazing of the stainless steel plates 42, 44, 46 of the nozzle member 12 easily spreads over the contacting surfaces of the adjacent Ni plating films 58 provided on the bonding surfaces of the stainless steel plates 42, 44, 46. However, the molten silver-brazing alloy will not flow beyond the boundaries between the Ni plating films 58 and the exposed annular areas or regions of the surfaces of the stainless steel plates 42, 44, 46 which are not covered by the Ni plating films, whereby those annular areas around the edge of the openings of the holes 48, 50, 52 and nozzles 28 are protected from the silver-brazing alloy.

Therefore, the method of brazing the orifice plate 42, distributor plate 44 and nozzle plate 46 according to the present invention is effective to avoid spreading of the brazing material beyond the desired bonding areas, even if the quantity of the brazing material (i.e., silver-brazing alloy or silver solder) is large enough to assure firm bonding of the stainless steel plates (i.e., orifice, distributor and nozzle plates 42, 44, 46).

Accordingly, the present method of brazing the metallic components 42, 44, 46 of the nozzle member 12 of the ink-jet print head 10 provides for effective elimination or minimization of the conventionally encountered problems such as deformation, plugging or closure of the ink passageways, nozzles and other minute openings due to spreading or dislocation of the brazing material beyond the desired bonding areas, and insufficient sealing, air gaps left in the nozzle member 12 and other bonding defects due to insufficient quantity of the brazing material.

Further, the present brazing method does not require special process steps and equipment and can be practiced in a manner similar to an ordinary brazing procedure, except for the application of patterned nickel (Ni) plating films 58 to the three stainless steel plates 42, 44, 46 to be bonded together, which is accomplished by a known ordinary electroplating technique. Thus, the present brazing method permits comparatively easy and economical fabrication of the nozzle member 12 with the desired characteristics and quality.

A microscopic observation of the holes 48, 50, 52 and nozzles 28 of the nozzle member 12 of the print head 10 manufactured according to the method of the illustrated embodiment showed complete absence or elimination of the conventionally encountered deformation, plugging or closure of those openings due to the dislocation of the brazing material. The produced nozzle member 12 was cut to expose the interior structure, namely, to obtain the cut surfaces as shown in the cross sectional view of FIG. 1. The cut surfaces were ground, and the ground surfaces were inspected by a microscope. The microscopic inspection confirmed uniform and complete bonding of the three stainless steel plates 42, 44, 46 by the silver-brazing alloy sheets 60 interposed between the Ni plating films 58 formed on the bonding surfaces, without any defects such as air gaps.

For comparison, the three stainless steel plates 42, 44, 46 without the patterned Ni plating films 58 were superposed on each other and brazed under heat, in the same manner as described above. The thus produced nozzle member was cut, and the cut surfaces were ground and inspected by a microscope. The inspection revealed the presence of a considerable number of air gaps between the bonding surfaces of the plates, particularly, around the nozzles.

Another comparative specimen was prepared with nickel used in place of the silver-brazing alloy. The bonding surfaces of the stainless steel plates without the Ni plating films 58 were coated by printing with a paste of nickel, and the coated plates were superposed and brazed under heat as described above. A microscopic observation confirmed plugging of the holes 48, 50, 52 and nozzles 28 with the nickel brazing material which spread beyond the bonding areas.

While the present invention has been described in detail in its presently preferred embodiment, for illustrative purpose only, it is to be understood that the invention is not limited to the details of the illustrated embodiment, but may be otherwise embodied.

In the illustrated embodiment, the silver-brazing alloy for brazing the three stainless steel plates 42, 44, 46 takes the form of the brazing sheets 60 which are patterned according to the configurations of the plates to be bonded. However, the silver-brazing alloy may take the form of layers of a paste having a suitable thickness applied by printing to the patterned Ni plating films 58, so that the plates 42, 44, 46 coated with the paste layers are superposed on each other and heated for brazing by the molten silver-blazing alloy. This method is advantageous over the method using the brazing sheets, in terms of the cost of manufacture.

Although the illustrated embodiment uses the resin films 56 as protective films formed before application of the Ni plating films 58, the patterning of the Ni plating films 58 may be made by chemical etching or other photolithographic technique as applied to Ni platings formed so as to cover the entire surfaces of the stainless steel plates 42, 44, 46. That is, the Ni platings are patterned by photolithography to remove the local portions corresponding to the nozzles 28 and other openings and their vicinities. Regardless of the patterning method, the patterned Ni films may be formed by sputtering and other known thin-film forming techniques, in place of the electroplating utilized in the illustrated embodiment.

While the illustrated embodiment is applied to the manufacture of an ink-jet print head, more precisely, to the brazing of the three stainless steel plates which give the nozzle member of an ink-jet print head, it is to be understood that the principle of the present invention is equally applicable to the brazing of small-sized components of any other precision devices which require relatively high dimensional accuracy. The brazing material used, and the material of the metallic films formed on the bonding areas of the components are suitably selected depending upon the specific material of the components to be brazed.

It is to be understood that the nozzles 28, holes 38, 40, 48, 50, 52 and other openings have extremely small dimensions and the brazing sheets 60 have extremely small thickness, but the dimensions and thickness as shown in the accompanying drawings are made considerably larger than the actual dimensions and exaggerated with respect to the other portions of the print head 10, for easier understanding of the positional relationship.

It is also to be understood that the prevent invention may be embodied with various other changes, modifications and improvements, which may occur to those skilled in the art, without departing from the spirit and cope of the invention defined in the following claims.

What is claimed is:

1. A method of brazing a plurality of components by heating the components superposed on each other with a brazing material interposed between adjacent bonding surfaces of the components, said method comprising the steps of:

using a brazing material which has a relatively low degree of wettability with respect to the material of at least one of said plurality of components to be brazed;

forming a patterned film of a high-wettability metal having a relatively high degree of wettability with respect to said brazing material, on the bonding surface of each of said at least one component, so as to cover predetermined bonding areas of said bonding surface of said each of said at least one component, thereby leaving non-bonding areas of said bonding surface, said non-bonding areas being not covered by said patterned film; and applying said brazing material to said patterned film of said high-wettability metal, so that at a brazing temperature the brazing material does not spread onto said non-bonding areas of said bonding surface of said each of said at least one component.

2. A method according to claim 1, wherein said plurality of components are made of stainless steel, and said brazing material consists of a silver-brazing alloy.

3. A method according to claim 2, wherein said high-wettability metal consists of nickel (Ni).

4. A method according to claim 3, wherein said step of forming a patterned film of high-wettability metal comprises forming a film of nickel by electroplating.

5. A method according to claim 1, wherein said step of forming a patterned film of a high-wettability metal comprises applying protective films to non-bonded areas of said each bonding surface of said components, applying a film of said high-wettability metal to said each bonding surface, and removing said protective films to thereby form said patterned film of said high-wettability metal.

6. A method according to claim 1, wherein said step of applying said brazing material to said patterned film of said high-wettability metal consists of applying said brazing material in the form of a brazing sheet interposed between the patterned films of said high-wettability metal formed on the adjacent bonding surfaces of said components.

7. A method according to claim 1, wherein said step of applying said brazing material to said patterned film of said high-wettability metal consists of applying a paste of said brazing material by printing to said patterned film.

8. A method according to claim 1, wherein said plurality of components comprise a plurality of metallic planar members each having a plurality of openings formed through entire thicknesses thereof.

9. A method according to claim 8, wherein at least two planar members of said plurality of metallic planar members have corresponding holes which cooperate to define passageways.

10. A method according to claim 8, wherein said step of forming a patterned film of a high-wettability metal comprises applying said high-wettability metal to each bonding surface of said metallic planar members such that areas of said each bonding surface around edges of said openings are exposed.

11. A method according to claim 8, wherein said step of applying said brazing material to said patterned film of said high-wettability metal consists of applying said brazing material in the form of a brazing sheet (60) interposed between the patterned films of said high-wettability metal formed on the adjacent bonding surfaces of said components (42, 44, 46), said brazing sheet having openings corresponding to said plurality of openings formed through said metallic planar members.

12. A method according to claim 1, wherein said step of forming a patterned film of a high-wettability metal consists of forming said patterned film on each of the bonding surfaces of said components.

13. A method of producing an ink-jet print head having a nozzle member and a pump member bonded to said nozzle member, said nozzle member including a plurality of stainless steel plates which are brazed together, comprising the steps of:
  using a brazing material which has a relatively low degree of wettability with respect to the material of at least one of said plurality of stainless steel plates to be brazed;
  forming a patterned film of a high-wettability metal having a relatively high degree of wettability with respect to said brazing material, on the bonding surface of each of said at least one stainless steel plate, so as to cover predetermined bonding areas of said bonding surface of said each of said at least one stainless steel plate, thereby leaving non-bonding areas of said bonding surface, said non-bonding areas being not covered by said patterned film; and
  applying said brazing material to said patterned film of said high-wettability metal, so that at a brazing temperature the brazing material does not spread onto said non-bonding areas of said bonding surface of said each of said at least one stainless steel plate.

14. A method of brazing a plurality of metallic planar members by heating the metallic planar members superposed on each other with a brazing material interposed between adjacent bonding surfaces of the metallic planar members, at least one metallic planar member having at least one opening formed through an entire thickness thereof, said method comprising the steps of:
  using a brazing material which has a relatively low degree of wettability with respect to the material of said at least one metallic planar member;
  forming a patterned film of a high-wettability metal having a relatively high degree of wettability with respect to said brazing material, on the bonding surface of each of said at least one metallic planar member, such that an area of said bonding surface of said each of said at least one metallic planar member around an edge of said at least one opening is left uncovered by said patterned film; and
  applying said brazing material to said patterned film of said high-wettability film, so that at a brazing temperature the brazing material does not spread onto said area around said edge of said at least one opening.

15. The method according to claim 14, wherein only said area of said bonding surface of said each of said at least one metallic planar member is left uncovered by said patterned film.

16. A method according to claim 14, wherein at least two planar members of said plurality of metallic planar members have corresponding holes as said at least one opening, said corresponding holes cooperating with each other to define a passageway.

17. A method according to claim 14, wherein each of said plurality of metallic planar members consists of a stainless steel plate, and said brazing material consists of a silver-brazing alloy.

18. A method according to claim 14, wherein said high-wettability metal of said patterned film consists of nickel.

19. A method according to claim 14, wherein said step of applying said brazing material to said patterned film comprises applying said brazing material in the form of a brazing sheet which has at least one opening corresponding to said at least one opening of said at least one metallic planar member.

20. A method of brazing a plurality of metallic planar members by heating the metallic planar members superposed on each other with a brazing material interposed between adjacent bonding surfaces of the metallic planar members, at least one metallic planar member having at least one opening, said method comprising the steps of:
  using a brazing material which has a relatively low degree of wettability with respect to the material of said at least one metallic planar member;
  forming a patterned film of a high-wettability metal having a relatively high degree of wettability with respect to said brazing material, on the bonding surface of each of said at least one metallic planar member, such that an area of said bonding surface of said each of said at least one metallic planar member around an edge of said at least one opening is left uncovered by said patterned film; and
  applying said brazing material to said patterned film of said high-wettability film, so that at a brazing temperature the brazing material does not spread onto said area around said edge of said at least one opening.

21. The method according to claim 20, wherein only said area of said bonding surface of said each of said at least one metallic planar member is left uncovered by said patterned film.

22. A method according to claim 20, wherein said at least one opening comprises at least one opening formed through entire thickness of the corresponding component.

23. A method according to claim 22, wherein at least two metallic planar members of said plurality of metallic planar members have corresponding holes as said at least one opening, said corresponding holes cooperating with each other to define a passageway.

* * * * *